United States Patent
Yeh et al.

(10) Patent No.: US 11,289,044 B2
(45) Date of Patent: Mar. 29, 2022

(54) DISPLAY DEVICE

(71) Applicant: InnoLux Corporation, Miao-Li County (TW)

(72) Inventors: Chia-Min Yeh, Miao-Li County (TW); Hui-Min Huang, Miao-Li County (TW); Hsieh-Li Chou, Miao-Li County (TW); Cheng-Tso Chen, Miao-Li County (TW); Yu-Chien Kao, Miao-Li County (TW); Li-Wei Sung, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/900,973

(22) Filed: Jun. 14, 2020

(65) Prior Publication Data

US 2020/0410949 A1 Dec. 31, 2020

(30) Foreign Application Priority Data

Jun. 26, 2019 (CN) .......................... 201910562012.6

(51) Int. Cl.
*G02F 1/1343* (2006.01)
*G09G 3/36* (2006.01)
*G02F 1/1368* (2006.01)
*G02F 1/1362* (2006.01)

(52) U.S. Cl.
CPC ......... *G09G 3/3677* (2013.01); *G02F 1/1368* (2013.01); *G02F 1/136286* (2013.01); *G09G 3/3688* (2013.01); *G09G 2310/0278* (2013.01); *G09G 2320/0233* (2013.01)

(58) Field of Classification Search
None
See application file for complete search history.

(56) References Cited

U.S. PATENT DOCUMENTS

| 2007/0085862 | A1 | 4/2007 | Moriya | |
| 2010/0207858 | A1 | 8/2010 | Chen | |
| 2013/0027627 | A1* | 1/2013 | Kang | H01L 29/41733 349/46 |
| 2014/0152934 | A1* | 6/2014 | Huh | G02F 1/136286 349/43 |
| 2016/0035294 | A1* | 2/2016 | Kim | B41J 15/16 345/96 |
| 2016/0041437 | A1 | 2/2016 | Lin | |
| 2016/0055807 | A1* | 2/2016 | Lee | G09G 5/02 345/205 |

FOREIGN PATENT DOCUMENTS

CN 104238221 B 7/2018

* cited by examiner

*Primary Examiner* — Thanh Nhan P Nguyen
(74) *Attorney, Agent, or Firm* — Winston Hsu (57) ABSTRACT

A display device includes a substrate, a plurality of scan lines and a plurality of data lines. The data lines respectively have a first segment that overlaps one of the scan lines and a second segment that is located between adjacent two of the scan lines. A first segment of a first data line and a first segment of a second data line are separated by a distance Wa. A first segment of a third data line and a first segment of a fourth data line are separated by a distance Wc. A second segment of the first data line and a second segment of the second data line are separated by a distance W1. A second segment of the third data line and a second segment of the fourth data line are separated by a distance W3. The distances Wa, Wc, W1 and W3 have a relationship (W1/Wa)≠(W3/Wc).

17 Claims, 8 Drawing Sheets

DISPLAY DEVICE

CROSS REFERENCE TO RELATED APPLICATION

This application claims the benefit of Chinese Patent Application Serial No. 201910562012.6, filed Jun. 26, 2019, and the entire content of which is incorporated herein by reference.

BACKGROUND OF THE DISCLOSURE

1. Field of the Disclosure

The present disclosure relates to a display device. More particularly, the present disclosure relates to a liquid crystal display device with improved brightness.

2. Description of the Prior Art

Planar display device has become the mainstream display product for the features of thin thickness and lightweight. The display colors of the planar display device may be adjusted for different application purposes by, for example, adjusting the colors of the sub-pixel units of the display device. However, it is difficult to meet requirements of application needs and display quality at the same time.

SUMMARY OF THE DISCLOSURE

One objective of the present disclosure is to provide a display device which is able to meet the requirements for the colors of the sub-pixel units and the display quality at the same time.

An embodiment of the present disclosure provides a display device including a substrate, a plurality of scan lines disposed on the substrate and extending along a first direction, and a plurality of data lines disposed on the substrate and extending along a second direction different from the first direction, wherein the plurality of data lines comprise a first data line, a second data line, a third data line and a fourth data line arranged in sequence and respectively comprising a first segment that overlaps one of the plurality of scan lines and a second segment that is located between adjacent two of the plurality of scan lines, wherein the first segment of the first data line and the first segment of the second data line are separated by a distance Wa, the first segment of the third data line and the first segment of the fourth data line are separated by a distance Wc, the second segment of the first data line and the second segment of the second data line are separated by a distance W1, the second segment of the third data line and the second segment of the fourth data line are separated by a distance W3, wherein the distances Wa, Wc, W1 and W3 have a relationship (W1/Wa)≠(W3/Wc).

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function.

In the following description and in the claims, the terms "include", "comprise" and "have" are used in an open-ended fashion, and thus should be interpreted to mean "include, but not limited to . . . ". It will be understood that when an element (or its variant, for example layer or region) is referred to as being "disposed on" another element (or its variant), it may be directly disposed on the another element, or may be indirectly disposed on the another element with an intervening element presented therebetween. On the other hand, when an element is referred to as being "directly on" another element (or its variant), there are no intervening elements presented. Furthermore, it will be understood that when a component is referred to as being "connected to" or "electrically connected to" another component (or its variant), it may be directly electrically connected to the another component, or may be electrically connected to the another component through one or more intervening components.

Although the terms such as first, second, etc. may be used in the description and following claims to describe various components in claims, these terms doesn't mean or represent the claimed components have order and doesn't represent the order of one claimed component and another one claimed component, or the sequence in manufacturing method. These terms are used to discriminate a claimed component with a denomination from another one claimed component with the same denomination.

It should be noted that the technical features in different embodiments described in the following description can be replaced, recombined, or mixed with one another to constitute another embodiment without departing from the spirit of the present disclosure.

The terms such as "space" or "distance" between elements and "width" or "length" of the element used in the disclosure are defined by the projection of the element on the XY plane, YZ plane or XZ along the X direction, the Y direction. Similarly, terms such as "parallel" or "non-parallel" used herein refers to the projections of the extending lines of the elements on the XY plane, the YZ plane, or the XZ plane are "parallel" or "non-parallel." The term "angle" used herein refers to the angle between the edges of the elements.

Figure 1:
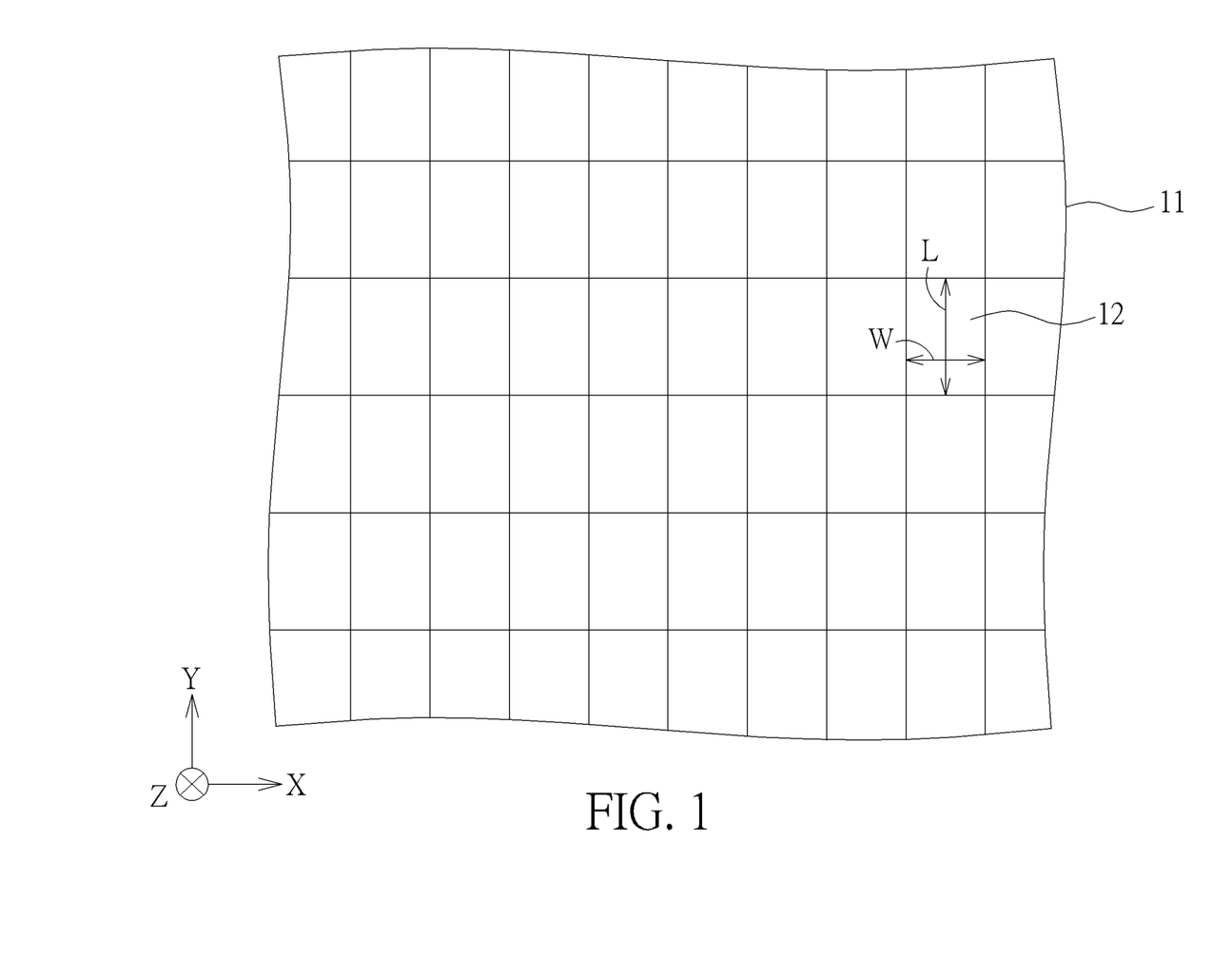
FIG. 1 is a schematic diagram illustrating a top view of a display device according to an embodiment of the present disclosure.
Figure 2:
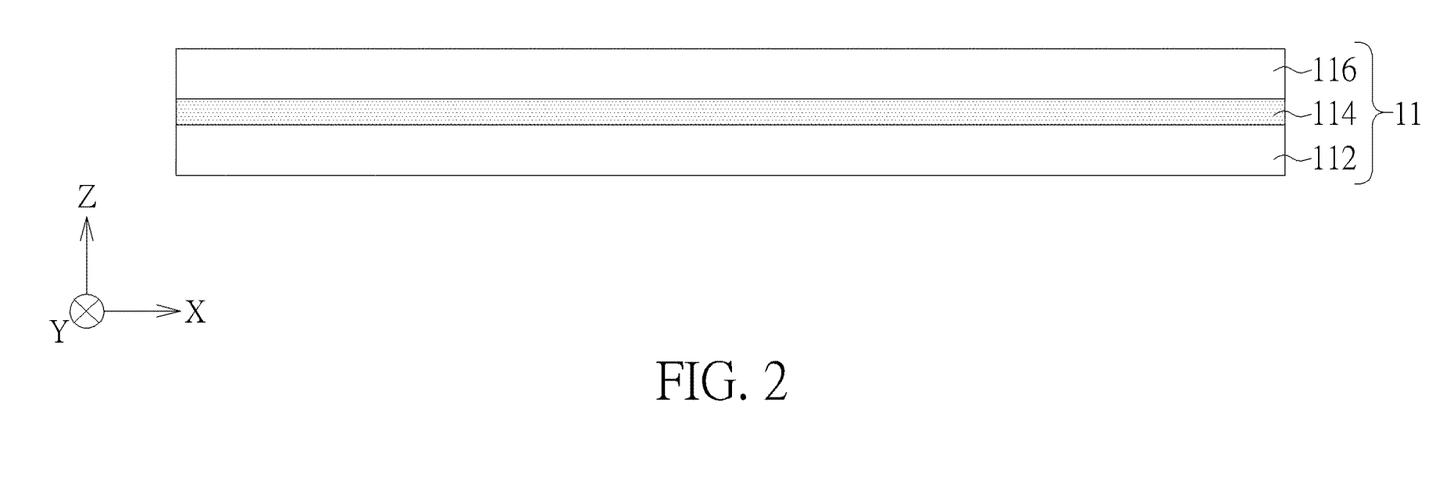
FIG. 2 is a schematic diagram illustrating a cross-sectional view of the display device as shown in FIG. 1.

Please refer to FIG. 1 and FIG. 2. FIG. 1 is a schematic diagram illustrating a top view of a display device 11 according to an embodiment of the present disclosure. FIG. 2 is a schematic diagram illustrating a cross-sectional view of the display device 11 shown in FIG. 1. As shown in FIG. 1, the display device 11 has a surface extending along a first direction (for example, the X direction) and a second direction (for example, the Y direction). The display device 11 includes a pixel matrix comprising a plurality of pixel units 12 arranged along the X direction and the Y direction. Each pixel unit 12 has a length L and a width W. The X direction and the Y direction are perpendicular to each other, and the direction Z is a direction perpendicular to the plane defined by the X direction and the Y direction. As shown in FIG. 2, the display device 11 may include a first substrate 112 and a second substrate 116 disposed opposite to the first substrate 112, and a display medium layer 114 is disposed between the first substrate 112 and the second substrate 116. The first substrate 112 and the second substrate 116 may be transparent substrates. In some embodiments, the first substrate 112 and the second substrate 116 may include hard substrates such as glass substrates, quartz substrates or sapphire substrates, but not limited thereto. In some embodiments, the first substrate 112 and the second substrate 116 may include flexible substrates such as plastic substrates including, for example, polyimide (PI), polycarbonate (PC) or polyethylene terephthalate (PET), other suitable materials, or a combination thereof, but not limited thereto. The display medium layer 114 may be, for example, a liquid crystal layer, but not limited thereto. In some embodiments, the display device 11 may further include a sealant layer (not shown) disposed between the first substrate 112 and the second substrate 116 for bonding the first substrate 112 and the second substrate 116. In some embodiments, the display device 11 may further include spacers (not shown) disposed between the first substrate 112 and the second substrate 116 for defining the gap filled by the display medium layer 114 between the first substrate 112 and the second substrate 116. The spacers may hold the first substrate 112 and the second substrate 116 at a specified distance. It should be noted that the shape of the pixel unit 12 shown in FIG. 1 is an example for the purpose of illustration and is not intended to limit the scope of the disclosure. The shape of the pixel unit 12 may be adjusted according to product requirements. The display device 11 may be a flat panel display device. In other embodiments of the present disclosure, the display device may be a non-planar display device, such as a curved display device.

For simplification of the drawings, some components disposed on the surfaces of the first substrate 112 and the second substrate 116 of the display device 11 shown in FIG. 1 and FIG. 2 have been omitted, such as insulating layers, semiconductor layers, circuit layers, color filters, light shielding layers, polarizers, and optical films, alignment films, planarization layers, but not limited thereto. For example, the first substrate 112 may be an array substrate having a circuit layer disposed thereon. The circuit layer may include components such as transistors, scan lines, data lines, pixel electrodes, and/or insulating layers, but not limited thereto. The second substrate 116 may be provided with a light shielding layer, such as a black matrix layer comprising a plurality of openings respectively arranged corresponding to a pixel electrode on the first substrate 112. A plurality of color filters including, for example, a red photoresist layer, a green photoresist layer, and/or a blue photoresist layer, may at least partially overlap the openings of the black matrix layer for adjusting the color of light passing through each opening. In some embodiments, at least a portion of the layers and/or components on the second substrate 116 may be disposed on the first substrate 112, but not limited thereto. In addition, a backlight unit (not shown) may be disposed on one side of the display device 11, for example, disposed under the first substrate 112. The backlight unit may include light emitting diode (LED), mini LED, micro LED, quantum dot (QD) devices, quantum dot LED (QLED or QD-LED), fluorescent devices, phosphor devices, or other suitable materials, or a combination thereof, but not limited thereto.

Figure 3:
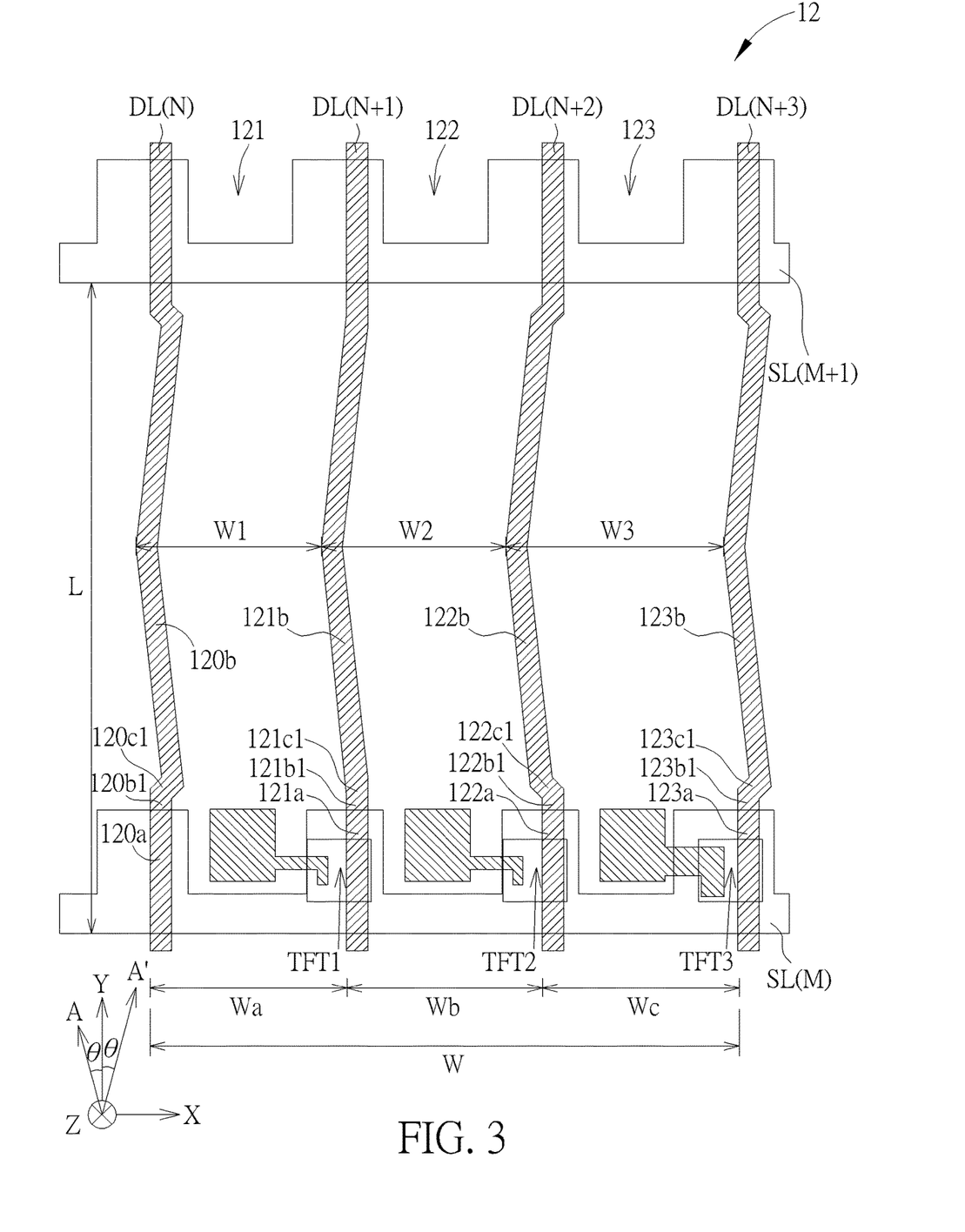
FIG. 3 is a schematic diagram illustrating an enlarged top view of a pixel unit of the display device as shown in FIG. 1.
Figure 4:
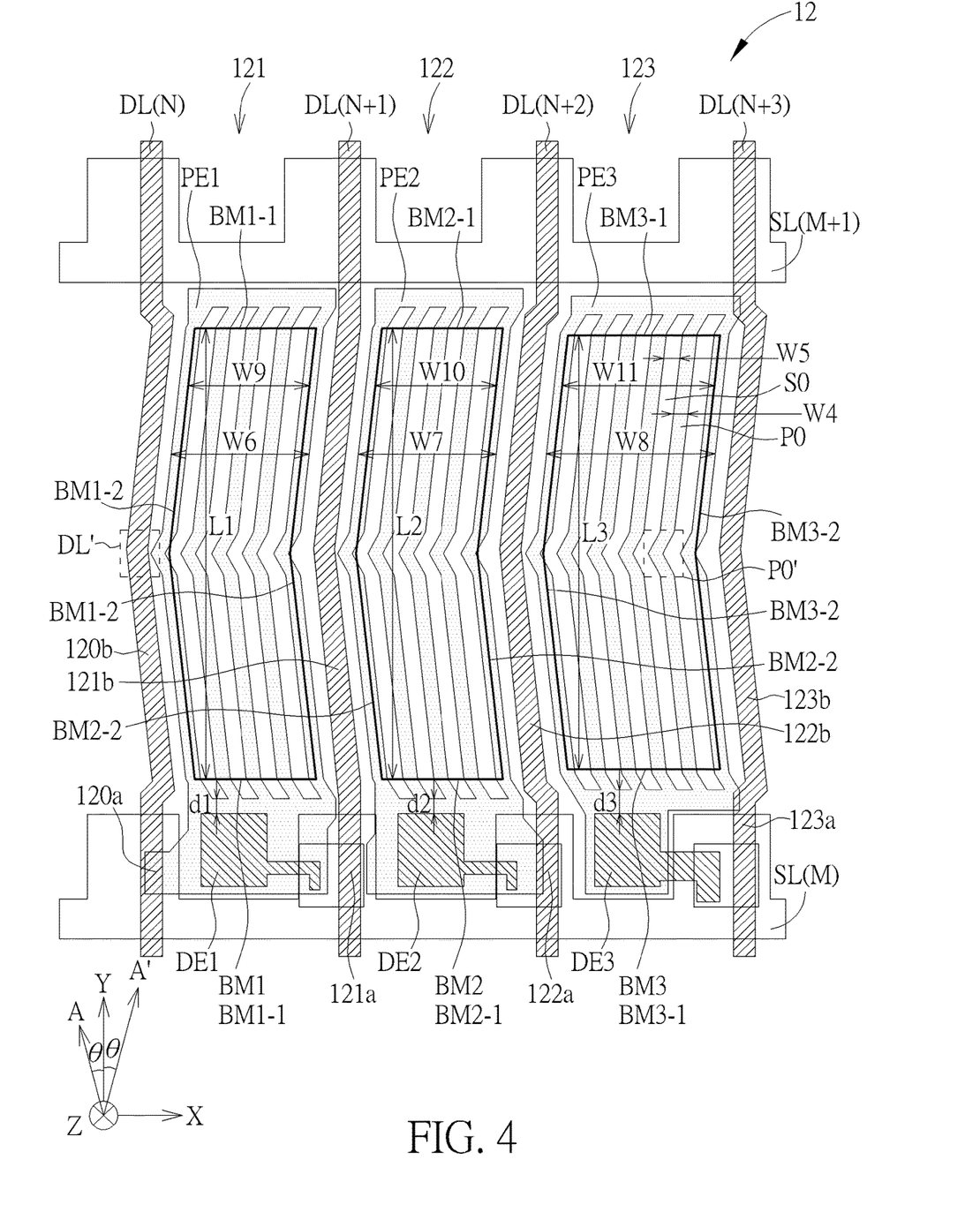
FIG. 4 is a schematic diagram illustrating a top view of the pixel electrodes and the mask openings of the pixel unit as shown in FIG. 3.
Figure 5:
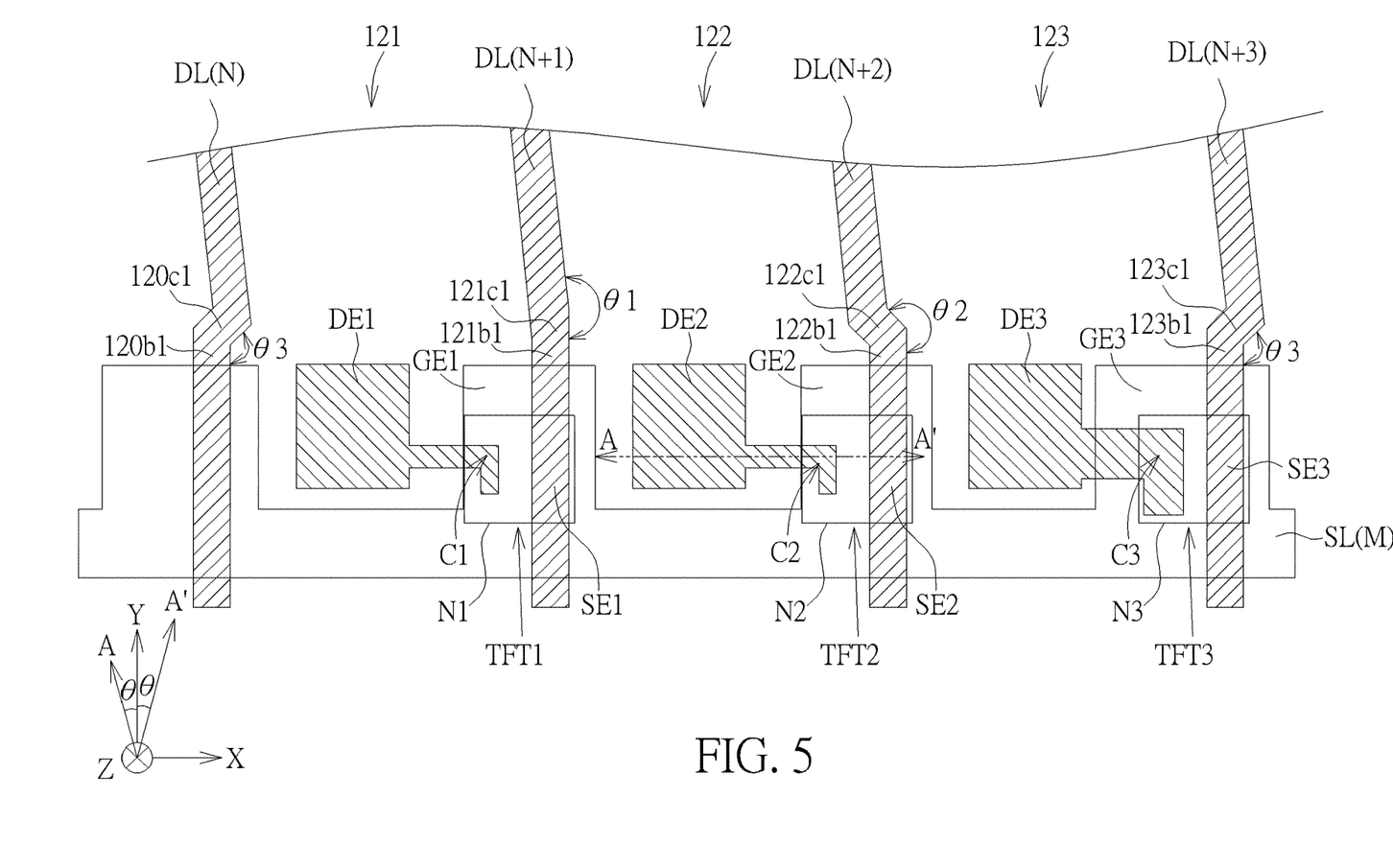
FIG. 5 is a schematic diagram illustrating a partial enlarged top view of the pixel unit as shown in FIG. 3.

Please refer to FIG. 3, FIG. 4 and FIG. 5. FIG. 3 is a schematic diagram illustrating an enlarged top view of a pixel unit 12 of the display device 11 shown in FIG. 1. FIG. 4 is a schematic diagram illustrating a top view of the sub-pixel electrodes PE and the mask openings BM of the sub-pixel units 121, 122, 123 of the pixel unit 12 as shown in FIG. 3. FIG. 5 is a schematic diagram illustrating a partial enlarged top view of the pixel unit 12 as shown in FIG. 3. Hereinafter, the pixel unit 12 comprising three sub-pixels is an example to facilitate the narration of the concepts and features of the present disclosure. Those skilled in the art should understand that the concept of the present disclosure may be applied to other display devices having pixel units comprising different numbers and/or different shapes of sub-pixels.

As shown in FIG. 3 and FIG. 4, the pixel unit 12 is approximately located between the adjacent first scan line SL(M) and the second scan line SL(M+1) and includes a first sub-pixel unit 121, a second sub-pixel unit 122 and a third sub-pixel unit 123 respectively located between the first data line DL(N) and the second data line DL(N+1), the second data line DL(N+1) and the third data line DL(N+2), the third data line DL(N+2) and the fourth data line DL(N+3). M and N are any positive integers, respectively. The first scan line SL(M) and the second scan line SL(M+1) respectively extend along the X direction and are arranged along the Y direction. The first data line DL(N), the second data line DL(N+1), the third data line DL(N+2), and the fourth data line DL(N+3) respectively extend along the Y direction and are arranged in sequence along the X direction. The length L of the pixel unit 12 is the minimum distance from an edge of the first scan line SL(M) to the corresponding edge of the second scan line SL(M+1). For example, as shown in FIG. 3, the length L of the pixel unit 12 is the minimum distance from the lower edge of the first scan line SL(M) to the corresponding lower edge of the second scan line SL(M+1). The width W of the pixel unit 12 is the minimum distance from an edge of the first data line DL(N) to the corresponding edge of the fourth data line DL(N+3). For example, as shown in FIG. 3, the width W of the pixel unit 12 is the minimum distance from the left edge of the first data line DL(N) to the left edge of the fourth data line DL(N+3).

The first data line DL(N), the second data line DL(N+1), the third data line DL(N+2), and the fourth data line DL(N+3) respectively include at least a first segment that overlaps the first scan line SL(M) and a second segment that is between the first scan line SL(M) and the second scan line SL(M+1). For example, as shown in FIG. 3, the first data line DL(N) includes a first segment 120a and a second segment 120b. The second data line DL(N+1) includes a first segment 121a and a second segment 121b. The third data line DL(N+2) includes a first segment 122a and a second segment 122b. The fourth data line DL(N+3) includes a first segment 123a and a second segment 123b. The first data line DL(N) may be formed by alternately arranging the first segment 120a and the second segment 120b along the Y direction. The second data line DL(N+1) may be formed by alternately arranging the first segment 121a and the second segments 121b along the Y direction. The third data line DL(N+2) may be formed by alternately arranging the first segment 122a and the second segment 122b along the Y direction. The fourth data line DL (N+)3) may be formed by alternately arranging the first segment 123a and the second segment 123b along the Y direction. According to some embodiments of the present disclosure, the second segment of each data line may include a first portion that directly connects the first segment and a second portion that directly connects the first portion. For example, as shown in FIG. 3, the second segment 120b of the first data line DL(N) may include a first portion 120b1 directly connecting the first segment 120a and a second portion 120c1 directly connecting the first portion 120b1. The second segment 121b of the second data line DL(N+1) may include a first portion 121b1 directly connecting the first segment 121a and a second portion 121c1 directly connecting the first portion 121b1. The second segment 122b of the third data line DL(N+2) may include a first portion 122b1 directly connecting the first segment 122a and a second portion 122c1 directly connecting the first portion 122b1. The second segment 123b of the fourth data line DL(N+3) may include a first portion 123b1 directly connecting the first segment 123a and a second portion 123c1 directly connecting the first portion 123b1.

The pixel unit 12 of the display device 11 includes a plurality of sub-pixel units. For example, as shown in FIG. 3, the pixel unit 12 includes three sub-pixel units, including the first sub-pixel unit 121, the second sub-pixel unit 122, and the third sub-pixel unit 123. The first sub-pixel unit 121, the second sub-pixel unit 122, and the third sub-pixel unit 123 are located between the first scan line SL(M) and the second scan line SL(M+1). More specifically, the first sub-pixel unit 121 is located between the first data line DL(N) and the second data line DL(N+1), the second sub-pixel unit 122 is located between the second data line DL(N+1) and the third data line DL(N+2), and the third sub-pixel unit 123 is located between the third data line DL (N+2) and the fourth data line DL (N+3). According to some embodiments, the first sub-pixel unit 121 may include a first sub-pixel electrode PE1, the second sub-pixel unit 122 may include a second sub-pixel electrode PE2, and the third sub-pixel unit 123 may include a third sub-pixel electrodes PE3. According to some embodiments, display device 11 may display a variety of colors. According to some embodiments, the display device 11 may display primary colors, such as red (R), green (G), or blue (B). Color filter layers (not shown) of red (R), green (G), or blue (B) may be respectively disposed on the regions of the first sub-pixel unit 121, the second sub-pixel unit 122, and the third sub-pixel unit 123 to determine the colors of the sub-pixel units. The "white dot" of the display device 11 is the color of light formed by mixing the lights of the R, G or B color dots. The display device 11 provided by the present disclosure may achieve the desired color of "white dot", or may achieve the desired colors of the R, G or B color dots, respectively, by adjusting the design of the sub-pixel units 121, 122, 123 of the pixel unit 12, the display device 11, and therefore provides an improved display quality.

Please refer to FIG. 5. The display device 11 further includes a first thin-film transistor TFT1 electrically connected to the first sub-pixel electrode PE1, a second thin-film transistor TFT2 electrically connected to the second sub-pixel electrode PE2, and a third thin-film transistor TFT3 electrically connected to the three sub-pixel electrode PE3. The first thin-film transistor TFT1 may include a first gate GE1, a first semiconductor layer N1, a first drain DE1, and a first source SE1. The second thin-film transistor TFT2 may include a second gate GE2, a second semiconductor layer N2, a second drain DE2, and a second source SE2. The third thin film transistor TFT3 may include a third gate GE3, a third semiconductor layer N3, a third drain DE3, and a third source SE3. The first gate GE1, the second gate GE2, and the third gate GE3 are electrically connected to the first scan line SL(M), respectively. The second data line DL(N+1) is electrically connected to the first sub-pixel electrode PE1 through the first thin-film transistor TFT1 to control the display brightness of the first sub-pixel unit 121. The third data line DL(N+2) is electrically connected to the second sub-pixel electrode PE2 through the second thin-film transistor TFT2 to control the display brightness of the second sub-pixel unit 122. The fourth data line DL(N+3) is electrically connected to the third sub-pixel electrode PE3 through the third thin-film transistor TFT3 to control the display brightness of the third sub-pixel unit 123. The first gate GE1, the second gate GE2, and the third gate GE3 may be formed in parts of the first scan line SL(M). Referring to FIG. 5, the first gate GE1 is at least partially overlapped with the second data line DL(N+1), the first drain DE1, and the first semiconductor layer N1. The second gate GE2 is at least partially overlapped with the third data line DL(N+2), the second drain DE2, and the second semiconductor layer N2. The third gate GE3 is at least partially overlapped with the fourth data line DL (N+3), the third drain DE3, and the third semiconductor layer N3. The first scan line SL(M), the second scan line SL(M+1), the first data line DL(N), the second data line DL(N+1), the third data line DL(N+2), the fourth data line DL(N+3), the first thin-film transistor TFT1, the second thin-film transistor TFT2, the third thin-film transistor TFT3, the first sub-pixel electrode PE1, the second sub-pixel electrode PE2, and the third sub-pixel electrode PE3 may be formed on the first substrate 112 by conventional manufacturing process including, for example, thin film deposition process, patterning process such as exposure and development process, etching process or other applicable processes. Detailed manufacturing processes are not described herein for the sake of simplicity.

The present disclosure may improve the display quality by adjusting the design of the sub-pixel units 121, 122 and 123 of the pixel unit 12 to have different areas. In some embodiments of the present disclosure, the adjustments may be adjusting the widths of the sub-pixel electrodes, increasing the area of the sub-pixel electrodes, making the sub-pixel electrodes and the data lines partially overlapped, adjusting the design of the color filter layers, or adjusting the areas of the openings of the black matrix layer of the sub-pixel units, the brightness of each sub-pixel units may be able to reach the target as desired. According to some embodiments, the display quality of the display device 11 may be further improved by adjusting the capacitances of the thin-film transistors of the sub-pixel units or by adjusting the overlapping areas of the sub-pixel electrodes of the sub-pixel units and the data lines and/or the scan lines. The image flicker problems may also be reduced.

According to the embodiment as shown in FIG. 4, the first sub-pixel electrode PE1, the second sub-pixel electrode PE2, and the third sub-pixel electrode PE3 respectively include a plurality of branch electrodes P0 and slits S0 extending along the Y direction and alternately arranged along the X direction for providing an electric field that controls the orientations of the liquid crystal molecules, so as to adjust the brightness of the sub-pixel units. The branch electrodes P0 have a width W4 in the X direction. The slits S0 have a width W5 in the X direction. In some embodiment, the branch electrodes P0 and/or the slits S0 of the first sub-pixel electrode PE1, the second sub-pixel electrode PE2 and the third sub-pixel electrode PE3 have a same width in the first direction. At least two of the first sub-pixel electrode PE1, the second sub-pixel electrode PE2, and the third sub-pixel electrode PE3 have different numbers of branch electrodes P0. Accordingly, in the X direction, at least two of the width W6 of the first sub-pixel electrode PE1, the width W7 of the second sub-pixel electrode PE2, and the width W8 of the third sub-pixel electrode PE3 are different. In some embodiments, in the X direction, at least two of the width W6 of the first sub-pixel electrode PE1, the width W7 of the second sub-pixel electrode PE2, and the width W8 of the third sub-pixel electrode PE3 may differ by n times of the sum of the width W4 of the branch electrode P0 and the width W5 of the slit S0, and n is a positive integer greater than zero. In some embodiments, the width W8 of the third sub-pixel electrode PE3 differs from the width W6 of the first sub-pixel electrode PE1 by n times of the sum of the width W4 of the branch electrode P0 and the width W5 of the slit S0. In some embodiments, the width W8 of the third sub-pixel electrode PE3 differs from the width W7 of the second sub-pixel electrode PE2 by n times of the sum of the width W4 of the branch electrode P0 and the width W5 of the slit S0. In some embodiments, the width W6 of the first sub-pixel electrode PE1 differs from the width W7 of the second sub-pixel electrode PE2 by n times of the sum of the width W4 of the branch electrode P0 and the width W5 of the slit S0. The additional branch electrodes P0 and slits S0 of a sub-pixel electrode having a larger width may provide an additional electric field to the corresponding region to drive the liquid crystal molecules and thereby increasing the brightness of the sub-pixel unit. In addition to adjusting the widths of the sub-pixel electrodes, the areas of the sub-pixel electrodes may also be adjusted by adjusting the lengths of the branch electrodes P0 and the slits S0 in the Y direction or by adjusting the shapes of the sub-pixel electrodes to obtain the design of the sub-pixel electrodes having larger or smaller areas. Furthermore, the electric fields corresponding to the sub-pixel electrodes may also be adjusted to achieve improved display quality.

According to the embodiment as shown in FIG. 4, the width W6 of the first sub-pixel electrode PE1 and the width W8 of the third sub-pixel electrode PE3 may differ by an amount of one width W4 of the branch electrode P0 and one width W5 of the slit S0. The width W7 of the second sub-pixel electrode PE2 and the width W8 of the third sub-pixel electrode PE3 may differ by an amount of one width W4 of the branch electrode P0 and one width W5 of the slit S0. The width W8 of the third sub-pixel electrode PE3 is greater than the width W6 of the first sub-pixel electrode PE1, and the width W8 of the third sub-pixel electrode PE3 is greater than the width W7 of the second sub-pixel electrode PE2. The lengths of the slits in the sub-pixel electrodes may be the same or different. For example, as shown in FIG. 4, the slits S0 of the first sub-pixel electrode PE1 may have a length larger than the length of the slits S0 of the third sub-pixel electrode PE3. The slits S0 of the second sub-pixel electrode PE2 may have a length larger than the length of the slits S0 of the third sub-pixel electrode PE3. The lengths of the branch electrodes P0 of the sub-pixel electrodes may also be adjusted to be the same or different.

According to some embodiments of the present disclosure, in order to increase efficiency of the sub-pixel units or concerning the electrical characteristics such as capacitive coupling effect between the sub-pixel units, at least one of the sub-pixel electrodes may partially overlap at least one of the data lines and/or at least one of the scan lines. As shown in FIG. 4, the first sub-pixel electrode PE1 is partially overlapped with a nearby data line. For example, the first sub-pixel electrode PE1 may be partially overlapped with the first segment 120a of the first data line DL(N). The second sub-pixel electrode PE2 may be partially overlapped with the first segment 122a of the third data line DL(N+2). The third sub-pixel electrode PE3 may be partially overlapped with the fourth data line DL(N+3). It should be understood that all the above are exemplary examples and are not intent to limit the scope of the present disclosure.

At least two of the slit S0 of the first sub-pixel electrode PE1, the slit S0 of the second sub-pixel electrode PE2 and the slit S0 of the third sub-pixel electrode PE3 have different lengths in the Y direction. For example, please refer to the region where the first sub-pixel electrode PE1, the second sub-pixel electrode PE2, and the third sub-pixel electrode PE3 adjacent to the same scan line, i.e., the first scan line SL(M). A least two of the slit S0 of the first sub-pixel electrode PE1, the slit S0 of the second sub-pixel electrode PE2 and the slit S0 of the third sub-pixel electrode PE3 are distanced from the corresponding drain by different minimum distances in the Y direction. For example, as shown in FIG. 4, the slit S0 of the first sub-pixel electrode PE1 is distanced from the first drain DE1 by the distance d1 in the Y direction. The slit S0 of the second sub-pixel electrode PE2 is distanced from the second drain DE2 by the distance d2 in the Y direction. The slit S0 of the third sub-pixel electrode PE3 is distanced from the third drain DE3 by the distance d3 in the Y direction, and at least two of the distances d1, d2 and d3 are different. For example, in some embodiments, the distance d1, the distance d2 and the distance d3 may have the relationship: d1=d2≠d3. In some embodiments, the distance d1 is smaller than the distance d3 (d1<d3). In some embodiments, the distance d2 is smaller than the distance d3 (d2<d3).

The branch electrodes of the sub-pixel electrodes may have a bent shape, a linear shape or other suitable shapes. In some embodiments, each branch electrode of the sub-pixel electrode has a bent portion approximately in the middle and two extending portions disposed at two sides of the bent portion and adjacent to the scan lines. The bent portion and the extending portions of the branch electrode may have different angles with respect to the Y direction. For example, as shown in FIG. 4, each branch electrode P0 includes a bent portion P0' approximately in the middle and two extending portions disposed on two sides of the bent portion P0'. The two extending portions respectively extend along the A direction and the A' direction and have an angle Θ with respect to the Y direction. The bent portion P0' of the branch electrode P0 may facilitate the response speed of the display medium layer 114 (such as a liquid crystal layer) when an electric field is applied, and therefore a better control of the liquid crystal layer may be achieved. According to some embodiments, the angle Θ between the Y direction and the A direction or the A' direction may range from 0 to 45 degrees. In some embodiments, the angle Θ may range from 5 to 15 degrees. In some embodiments, the angle Θ may be approximately 7 degrees, but not limited thereto.

The first data line DL(N), the second data line DL(N+1), the third data line DL(N+2) and the fourth data line DL(N+3) may be substantially parallel to the branch electrodes P0 in order to generate an uniform electric field corresponding to the first sub-pixel unit 121, the second sub-pixel unit 122 and the third sub-pixel unit 123. In accordance with the branch electrodes P0, the first data line DL(N), the second data line DL(N+1), the third data line DL(N+2) and the fourth data line DL(N+3) may respectively include a bent portion DL' in the middle and two extending portions disposed on two sides of the bent portion DL' and respectively extending along the A direction and the A' direction. In some embodiment, the extending portions of the first data line DL(N), the second data line DL(N+1), the third data line DL(N+2) and the fourth data line DL(N+3) may respectively have an angle Θ with respect to the Y direction. The angle Θ between the Y direction and the two extending portions may be the same.

The first sub-pixel unit 121, the second sub-pixel unit 122 and the third sub-pixel unit 123 respectively include a first mask opening BM1, a second mask opening BM2 and a third mask opening BM3. The first mask opening BM1, the second mask opening BM2 and the third mask opening BM3 may be openings of a black matrix layer between the first substrate 112 and the second substrate 116 and are the light transparent regions corresponding to the sub pixel units respectively. The first mask opening BM1, the second mask opening BM2 and the third mask opening BM3 are located between the first scan line SL(M) and the second scan line SL(M+1). The first mask opening BM1 is located between the first data line DL(N) and the second data line DL(N+1), the second mask opening BM2 is located between the second data line DL(N+1) and the third data line DL(N+2), and the third mask opening BM3 is located between the third data line DL(N+2) and the fourth data line DL(N+3). As shown in FIG. 4, the first mask opening BM1 comprises a pair of first edges BM1-1 extending along the X direction and a pair of second edges BM1-2 disposed between the first edges BM1-1. The first mask opening BM1 has a length L1 and a width W9. The length L1 is defined by the distance between the first edges BM1-1 in the Y direction. The width W9 is defined by the distance between the second edges BM1-2 in the X direction. Similarly, the second mask opening BM2 comprises a pair of first edges BM2-1 extending along the X direction and a pair of second edges BM2-2 disposed between the first edges BM2-1. The second mask opening BM2 has a length L2 and a width W10; the length L2 is defined by the distance between the first edges BM2-1 in the Y direction and the width W10 is defined by the distance between the second edges BM2-2 in the X direction. The third mask opening BM3 comprises a pair of first edges BM3-1 extending along the X direction and a pair of second edges BM3-2 disposed between the first edges BM3-1. The third mask opening BM3 has a length L3 and a width W11; the length L3 is defined by the distance between the first edges BM3-1 in the Y direction and the width W11 is defined by the distance between the second edges BM3-2 in the X direction. The first mask opening BM1, the second mask opening BM2 and the third mask opening BM3 are disposed corresponding to the first sub-pixel electrode PE1, the second sub-pixel electrode PE2 and the third sub-pixel electrode PE3 respectively and expose the fence-like regions of the first sub-pixel electrode PE1, the second sub-pixel electrode PE2 and the third sub-pixel electrode PE3, respectively.

One feature of the present disclosure is that, the sub-pixel electrodes of the sub-pixel units may be individually adjusted during the manufacturing process of the display device according to the targets of the R, G or B color dots. In this way, it would be easier for the display device to display the desired color for various applications. In some embodiments of the present disclosure, when the sub-pixel units of the display device are using the same backlight element, the openings of the mask layer (for example, a black matrix layer) corresponding to the sub-pixel units may be individually adjusted, such that the sub-pixel units of the display device may reach their respective brightness targets. In this way, the sub-pixel units may reach the targets of the R, G, B color dots, or may reach the target of the white dot. The sub-pixel units or the color dots of the display device may provide improved display color or brightness.

In some embodiments of the present disclosure, in addition to adjusting the designs of the sub-pixel electrodes and/or the slits, the designs of the mask openings may also be adjusted to control the areas of the light transparent regions of the sub-pixel units, so that the sub-pixel units may have brightness closer to the desired values. The R, G or B color dots or white dot may be closer to the targets. The color display or brightness may be improved. In some embodiments, at least two of the first sub-pixel unit 121, the second sub-pixel unit 122 and the third sub-pixel unit 123 may include different sub-pixel electrode designs and/or different areas of the mask openings. For example, at least two of the first mask opening BM1, the second mask opening BM2 and the third mask opening BM3 have different areas. For example, in some embodiments, the first mask opening BM1 and the second mask opening BM2 may have a same area that is different from the area of the third mask opening BM3. In some embodiments, the second mask opening BM2 and the third mask opening BM3 may have a same area is different from the area of the first mask opening BM1. In some embodiments, the first mask opening BM1 and the third mask opening BM3 may have a same area that is different from the area of the second mask opening BM2. In some embodiments, the first mask opening BM1, the second mask opening BM2 and third mask opening BM3 may have areas that are different from one another.

According to an embodiment, the areas of the mask openings may be adjusted by adjusting the lengths and/or widths of the mask openings. According to an embodiment, at least two of the first mask opening BM1, the second mask opening BM2 and the third mask opening BM3 may have different lengths and/or widths. According to an embodiment, the length L1 of the first mask opening BM1 and the length L2 of the second mask opening BM2 are the same, and the length L3 of the third mask opening BM3 is different from the length L1 and the length L2. In some embodiments, the length L1 of the first mask opening BM1 and the length L3 of the third mask opening BM3 are the same, and the length L2 of the second mask opening BM2 is different from the length L1 and the length L3. In some embodiments, the length L3 of the third mask opening BM3 and the length L2 of the second mask opening BM2 are the same, and the length L1 of the first mask opening BM1 is different from the length L2 and the length L3. In some embodiments, the length L1 of the first mask opening BM1, the length L2 of the second mask opening BM2 and the length L3 of the third mask opening BM3 are different from one another. In some embodiments, the width W9 of the first mask opening BM1 and the width W10 of the second mask opening BM2 are the same, and the width W11 of the third mask opening BM3 is different from the width W9 and the width W10. In some embodiments, the width W9 of the first mask opening BM1 and the width W11 of the third mask opening BM3 are the same, and the width W10 of the second mask opening BM2 is different from the width W9 and the width W11. In some embodiments, the width W11 of the third mask opening BM3 and the width W10 of the second mask opening BM2 are the same, and the width W9 of the first mask opening BM1 is different from the width W10 and the width W11. In some embodiments, the width W9 of the first mask opening BM1, the width W10 of the second mask opening BM2 and the width W11 of the third mask opening BM3 are different from one another. According to the embodiment shown in FIG. 4, the area of the first mask opening BM1 may be smaller than the area of the third mask opening BM3, and the area of the first mask opening BM1 and the area of the second mask opening BM2 area may be the same. The width W9 of the first mask opening BM1 is smaller than the width W11 of the third mask opening BM3, and the width W9 of the first mask opening BM1 is the same as the width W10 of the second mask opening BM2. All the above are exemplary examples and are not intent to limit the scope of the present disclosure. The mask openings may be adjusted according to the designs of corresponding sub-pixel electrodes in order to cooperatively achieve desired brightness or performance of the display device.

In the following illustration, an embodiment showing the designs of the mask openings and the data lines is provided to obtain an improved aperture ratio when the overall area of the pixel unit 12 is kept the same.

As shown in FIG. 4, the second edges BM1-2 of the first mask opening BM1, the second edges BM2-2 of the second mask opening BM2 and the second edges BM3-2 of the third mask opening BM3 are parallel with the branch electrodes P0 of the sub-pixel electrodes PE1, PE2 and PE3 and are at least partially overlapped with the branch electrodes P0 adjacent to the data lines. In other embodiments, at least part of the second edges BM1-2, BM2-2 and BM3-2 may be located between the branch electrodes P0 of the first sub-pixel electrode PE1, the second sub-pixel electrode PE2 and the third sub-pixel electrode PE3 and the neighboring data lines, respectively. In accordance with the shape of the branch electrode P0, the second edges BM1-2, BM2-2 and BM3-2 may include two extending portions respectively extending along the A direction and the A' direction. In an embodiment, at least two of the first mask opening BM1, the second mask opening BM2 and the third mask opening BM3 may have different widths, lengths and/or areas. In an embodiment, at least two of the first edges BM1-1, BM2-1 and BM3 may have different lengths. In an embodiment, at least two of the second edges BM1-2, BM2-2 and BM3-2 may have different lengths. In order to obtain desired display colors or brightness of the first sub-pixel unit 121, the second sub-pixel unit 122 and the third sub-pixel unit 123, the lengths of the first edges BM1-1, BM2-1 and BM3-1 in the X direction may differ by n times of a sum of the width W4 of the branch electrode P0 and the width W5 of the slit S0, and n is a positive integer greater than zero.

Please refer to FIG. 3 and FIG. 4 at the same time. The first segment 120a of the first data line DL(N) and the first segment 121a of the second data line DL(N+1) are separated by a distance Wa. The first segment 121a of the second data line DL(N+1) and the first segment 122a of the third data line DL(N+2) are separated by a distance Wb. The first segment 122a of the third data line DL(N+2) and the first segment 123a of the fourth data line DL(N+3) are separated by a distance Wc. In some embodiments, the distance Wa, the distance Wb and the distance Wc may be the same. Each of the distance Wa, the distance Wb and the distance Wc are respectively one-third of the width W of the pixel unit 12. That is, the sum of the distance Wa, the distance Wb and the distance Wc equals to the width W of the pixel unit 12. By making the first segments of the data lines being separated by an equal distance may facilitate the designs of the corresponding thin-film transistors, the gates or drains of the thin-film transistors thereby making the sub-pixel units having similar or equivalent electrical characteristics. An improved display quality of the display device may be achieved.

Please still refer to FIG. 3 and FIG. 4. The first data line DL(N) and the second data line DL(N+1) are separated by a distance W1. The second data line DL(N+1) and the third data line DL(N+2) are separated by a distance W2. The third data line DL(N+2) and the fourth data line DL(N+3) are separated by a distance W3. The sum of the distance W1, the distance W2 and the distance W3 is equal to the width W. At least two of the distance W1, the distance W2 and the distance W3 are different. According to the above, the distances Wa, Wb, Wc, W1, W2, and W3 of the present disclosure may conform to at least one of the following relationships:

$$(W1/Wa) \neq (W3/Wc) \qquad \text{(equation 1)}$$

$$(W1/Wa) \neq (W2/Wb) \qquad \text{(equation 2)}$$

$$(W2/Wb) \neq (W3/Wc) \qquad \text{(equation 3)}$$

$$(W1/Wa) \neq (W2/Wb) \neq (W3/Wc) \qquad \text{(equation 4)}$$

$$(W1/Wa) = (W2/Wb) \neq (W3/Wc) \qquad \text{(equation 5)}$$

In some embodiments, the distance W1, the distance W2 and the distance W3 may correspond to the width W6 of the first sub-pixel electrode PE1, width W7 of the second sub-pixel electrode PE2 and the width W8 of the third sub-pixel electrode PE3, respectively. In some embodiments, the distance W1, the distance W2 and the distance W3 may differ by n times of a sum of the width W4 of the branch electrode P0 and the width W5 of the slit S0, and n is a positive integer greater than zero. The above illustrations are examples and are not intent to limit the scope of the present disclosure.

Please refer to FIG. 5, which is a schematic diagram illustrating a partial enlarged top view of the region of the pixel unit 12 nearby the first scan line SL(M). Another feature of the present disclosure is that, according to the differences between the distances Wa, Wb, Wc, W1, W2 and W3, the angle between the first portion 120b1 and the second portion 120c1 of the second segment 120b of the first data line DL(N), the angle between the first portion 121b1 and the second portion 121c1 of the second segment 121b of the second data line DL(N+1), the angle between the first portion 122b1 and the second portion 122c1 of the second segment 122b of the third data line DL(N+2) and the angle between the first portion 123b1 and the second portion 123c1 of the second segment 123b of the fourth data line DL(N+3) may be different to form smooth the connections and also provide an uniform resistance of each of the data lines. The risk of broken data lines during manufacturing process may also be reduced.

For example, as shown FIG. 5, the first portion 120b1 and the second portion 120c1 of the second segment 120b of the first data line DL(N) has an angle Θ3. The first portion 121b1 and the second portion 121c1 of the second segment 121b of the second data line DL(N+1) have an angle Θ1. The first portion 122b1 and the second portion 122c1 of the second segment 122b of the third data line DL(N+2) have an angle Θ2. The first portion 123b1 and the second portion 123c1 of the second segment 123b of the fourth data line DL(N+3) have the angle Θ3. At least two of the angles Θ1, Θ2 and Θ3 are different. The angles Θ1, Θ2 and Θ3 conform to at least one of the following relationships:

$$\Theta 1 \neq \Theta 3 \quad \text{(equation 6)}$$

$$\Theta 2 \neq \Theta 3 \quad \text{(equation 7)}$$

$$\Theta 1 \neq \Theta 2 \quad \text{(equation 8)}$$

$$\Theta 1 \neq \Theta 2 \neq \Theta 3 \quad \text{(equation 9)}$$

According to the angles between the first portions and the second portions, at least two of the second segments 120b, 121b, 122b and 123b of the first data line DL(N), the second data line DL(N+1), the third data line DL(N+2) and the fourth data line DL(N+3) may have different length.

In order to provide a display panel with improved display quality, the feedthrough voltage of the sub-pixel units may be proportional to the ratio Cgd/(Cst+Clc+Cgd), where Cst is the capacitance of the storage capacitor of the sub-pixel unit, Clc is the capacitance of the liquid crystal capacitor of the sub-pixel unit, and Cgd is the capacitance of the overlapping region of the gate and drain of the thin-film transistor of the sub-pixel unit. It is noticeable that the capacitance of the storage capacitor Cst and/or the capacitance of the liquid crystal capacitor Clc may be varied by varying the area of the sub-pixel electrode, so the ratio Cgd/(Cst+Clc+Cgd) will also be changed when the area of the sub-pixel electrode is changed. In order to keep the feedthrough voltages of the sub-pixel units of the display device substantially aligned, other capacitances of the sub-pixel units may be adjusted to compensate the variation of Cst and/or Clc caused by different areas of the sub-pixel electrodes for maintaining good display quality. For example, to compensate increased capacitance Cst and/or the capacitance Clc, the capacitance Cgd may be increased to keep the same Cgd/(Cst+Clc+Cgd) ratio and accordingly the feedthrough voltage may be kept in balance. On the other hand, to compensate reduced capacitance Cst and/or the capacitance Clc, the capacitance Cgd may be reduced. It should be understood that all the above are exemplary examples and are not intent to limit the scope of the present disclosure. In some embodiments, the sub-pixel units of the display device may have the same capacitances Cst, Clc or Cg when the areas of the sub-pixel electrodes thereof are different.

Another feature of the present disclosure is that, according to the difference of capacitance caused by the different pixel electrode areas of each sub-pixel unit, the capacitance Cgd between the drain and the gate of each sub-pixel unit may be adjusted by adjusting the overlapping area of the drain and the gate of the thin-film transistor. In this way, the electrical characteristics of the sub-pixel units of the display device may be approximately aligned and an improved display quality of the display device may be obtained. For example, for a sub-pixel unit having a sub-pixel electrode having a larger area, the capacitance Cgd between the drain and the gate of the sub-pixel unit may be increased accordingly, but not limited thereto. As shown in FIG. 5, the first drain DE1 and the first gate GE1 of the first thin-film transistor TFT1 have a first overlapping region C1 and a first overlapping area. The second drain DE2 and the second gate GE2 of the second thin-film transistor TFT2 have a second overlapping region C2 and a second overlapping area. The third drain DE3 and the third gate GE3 of the third thin-film transistor TFT3 have a third overlapping region C3 and a third overlapping area. The capacitance Cgd of the first overlapping region C1, the second overlapping region C2 and the third overlapping region C3 may be respectively adjusted by adjusting the overlapping area of the drain and the gate. The method of adjusting the overlapping area is, for example, to adjust the first gate GE1, the second gate GE2, and the third gate GE3 thereby making the first overlapping area of the first overlapping region C1, the second overlapping area of the second overlapping region C2, and the third overlapping area of the third overlapping region C3 different and producing different capacitance Cgd for compensating the differences of the capacitances Cst or Clc resulted from different areas of the first sub-pixel electrode PE1, the second sub-pixel electrode PE2 and the third sub-pixel electrode PE3. The areas of the overlapping regions may be adjusted by adjusting the width of the gates in the X direction. In some embodiments, the first overlapping area is smaller than the third overlapping area. In some embodiments, the second overlapping area is smaller than the third overlapping area. In some embodiments, the width of the first overlapping region C1 in the X direction is smaller than the maximum width of the third overlapping region C3 in the X. In some embodiments, the width of the first overlapping region C1 in the Y direction is smaller than the maximum width of the third overlapping region C3 in the Y direction.

Figure 6:
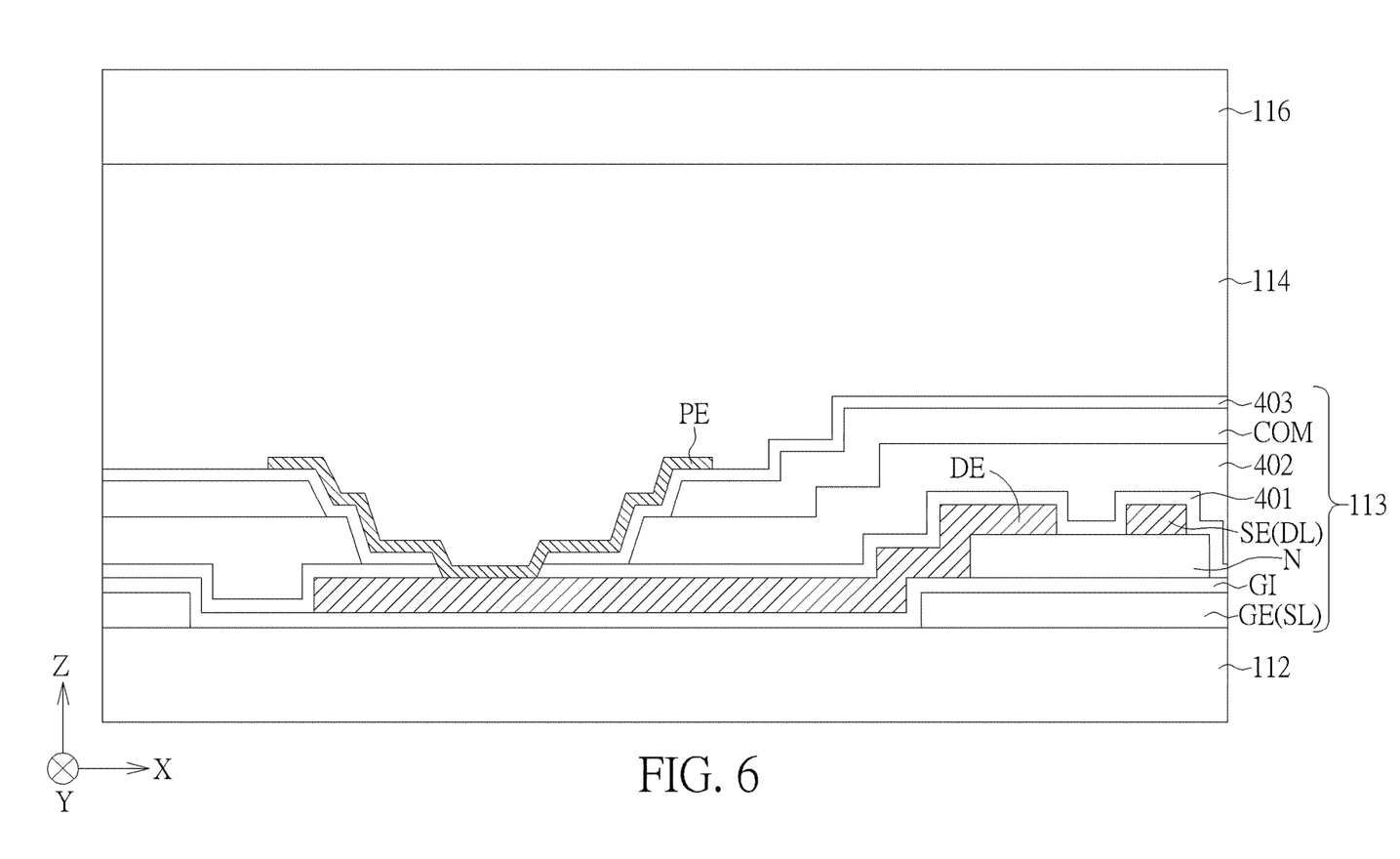
FIG. 6 is a schematic diagram illustrating a cross-sectional view of a display device according to an embodiment of the present disclosure.

Please refer to FIG. 6. FIG. 6 is a schematic diagram illustrating a cross-sectional view of a display device 11 according to an embodiment of the present disclosure. FIG. 6 may be a cross-sectional view of the second thin-film transistor TFT2 taken along line A-A' as shown in FIG. 5. It should be understood that some elements shown in FIG. 6 are not shown in FIG. 5 for the sake of simplicity. It should be also understood that the first thin-film transistor TFT1 and the third thin-film transistor TFT3 may have similar cross-sectional structures as shown in FIG. 6. The display device 11 shown in FIG. 6 includes a first substrate 112 and a second substrate 116 disposed opposite to the first substrate 112. A circuit layer 113 is disposed on the first substrate 112 and comprises a gate GE (corresponding to the second gate GE2), a gate dielectric layer GI disposed on the gate GE, a semiconductor layer N (corresponding to the second semiconductor layer N2) disposed on the gate dielectric layer GI, a source SE (corresponding to the second source SE2) and a drain DE (corresponding to the second drain DE2) disposed on the upper surface and on two sides of the semiconductor layer N, a first insulating layer 401 covering the semiconductor layer N, the source SE and the drain DE, a second insulating layer 402 covering the first insulating layer 401. According to the embodiment shown in FIG. 6, after forming the second insulating layer 402, the common electrode COM is formed on the second insulating layer 402 and a third insulating layer 403 is then formed on the common electrode COM. Afterward, a sub-pixel electrode PE (corresponding to the second sub-pixel electrode PE2) is formed on the third insulating layer 403. The gate GE is electrically connected to a scan line SL (corresponding to the first scan line SL(M)). The source SE is electrically connected to a data line DL (corresponding to the third data line DL(N+2)). The sub-pixel electrode PE fills into an opening penetrating through the first insulating layer 401 and the third insulating layer 403 and is electrically connected to the drain DE. The scan line SL controls the electrical connection between the source SE and the drain DE to supply image data to the sub-pixel electrode PE.

The first substrate 112 may be a transparent substrate and/or a hard substrate such as a glass substrate, a quartz substrate, or a sapphire substrate or a flexible substrate and/or a plastic substrate comprising polyimide (PI), polycarbonate (PC), polyethylene terephthalate (PET) or other suitable materials, but not limited thereto. A display medium layer 114, an alignment film (not shown) and spacers (not shown) may be disposed between the first substrate 112 and the second substrate 116, where the display medium layer 114 is between the circuit layer 113 and the second substrate 116. The display medium layer 114 may be a liquid crystal layer. The orientations of the liquid crystal molecules of the display medium layer 114 may be controlled by the electric field between the common electrode COM and the sub-pixel electrode PE to control the transmittance of the light from the backlight unit, thereby displaying an image.

The gate GE and the scan line SL may be formed by patterning a first conductive film. The drain DE, the source SE and the data line DL may be formed by patterning a second conductive film. The first conductive film and the second conductive film may comprise conductive materials, such as metals. For example, the first conductive film and the second conductive film may comprise conductive materials such as aluminum, copper, silver, chromium, titanium, molybdenum, nickel, or the like, or an alloy of the above metals, or a combination thereof, but not limited thereto. The arrangement of the scan line SL, the gate GE, the data line DL, the source SE and the sub-pixel electrode PE is shown in FIG. 3, for example.

The gate dielectric layer GI, the first insulating layer 401, the second insulating layer 402 and the third insulating layer 403 may respectively comprise dielectric materials, such as inorganic dielectric materials including silicon nitride (SiNx), silicon oxide ($SiO_x$), silicon oxynitride (SiON), or organic dielectric materials including acrylic resin, or other suitable dielectric materials, or a combination of the foregoing, but not limited thereto. In some embodiments, the second insulating layer 402 may include an organic dielectric material and has a sufficient thickness to serve as a planarization layer of the pixel array and a protective layer of the thin-film transistors. In some embodiments, the semiconductor layer N may include a semiconductor material such as amorphous silicon, polysilicon, oxide semiconductor, or other suitable materials, or a combination of the foregoing, but not limited thereto. The common electrode COM and the sub-pixel electrode PE may respectively comprise a transparent conductive material, such as indium tin oxide (ITO), antimony tin oxide (ATO), or fluorine doped tin oxide (FTO), but not limited thereto.

Figure 7:
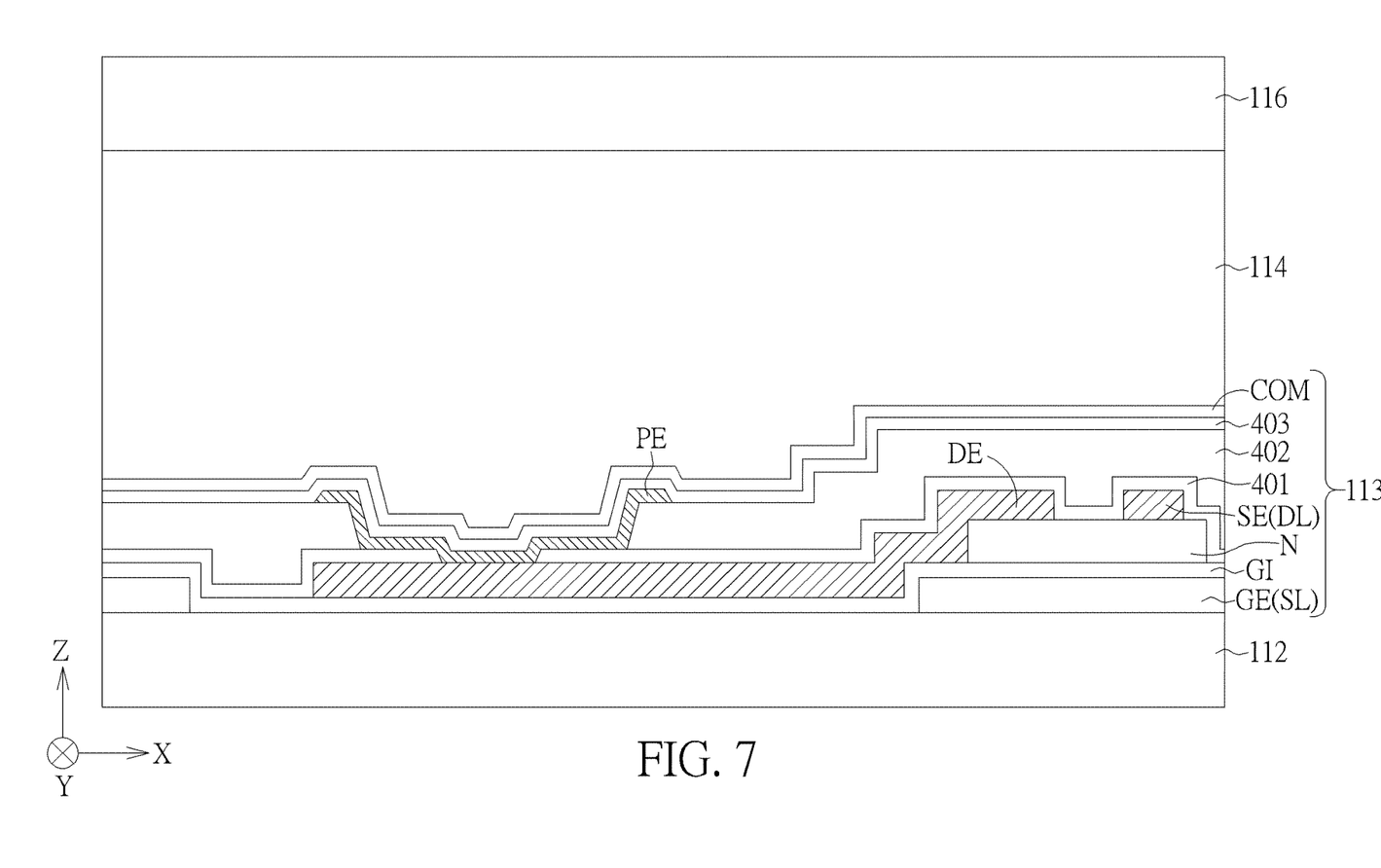
FIG. 7 is a schematic diagram illustrating a cross-sectional view of a display device according to another embodiment of the present disclosure.

Please refer to FIG. 7, which is a schematic diagram illustrating a cross-sectional view of a display device according to another embodiment of the present disclosure, wherein like reference numbers designate like or corresponding components as shown in FIG. 6 and description thereof is omitted. A difference between FIG. 6 and FIG. 7 is that, the common electrode COM of the display device of FIG. 7 is located above the sub-pixel electrode PE (corresponding to the second sub-pixel electrode PE2). As shown in FIG. 7, after forming the second insulating layer 402, the sub-pixel electrode PE is formed on the second insulating layer 402 and the third insulating layer 403 is then formed on the sub-pixel electrode PE. Afterward, the common electrode COM is formed on the third insulating layer 403.

Figure 8:
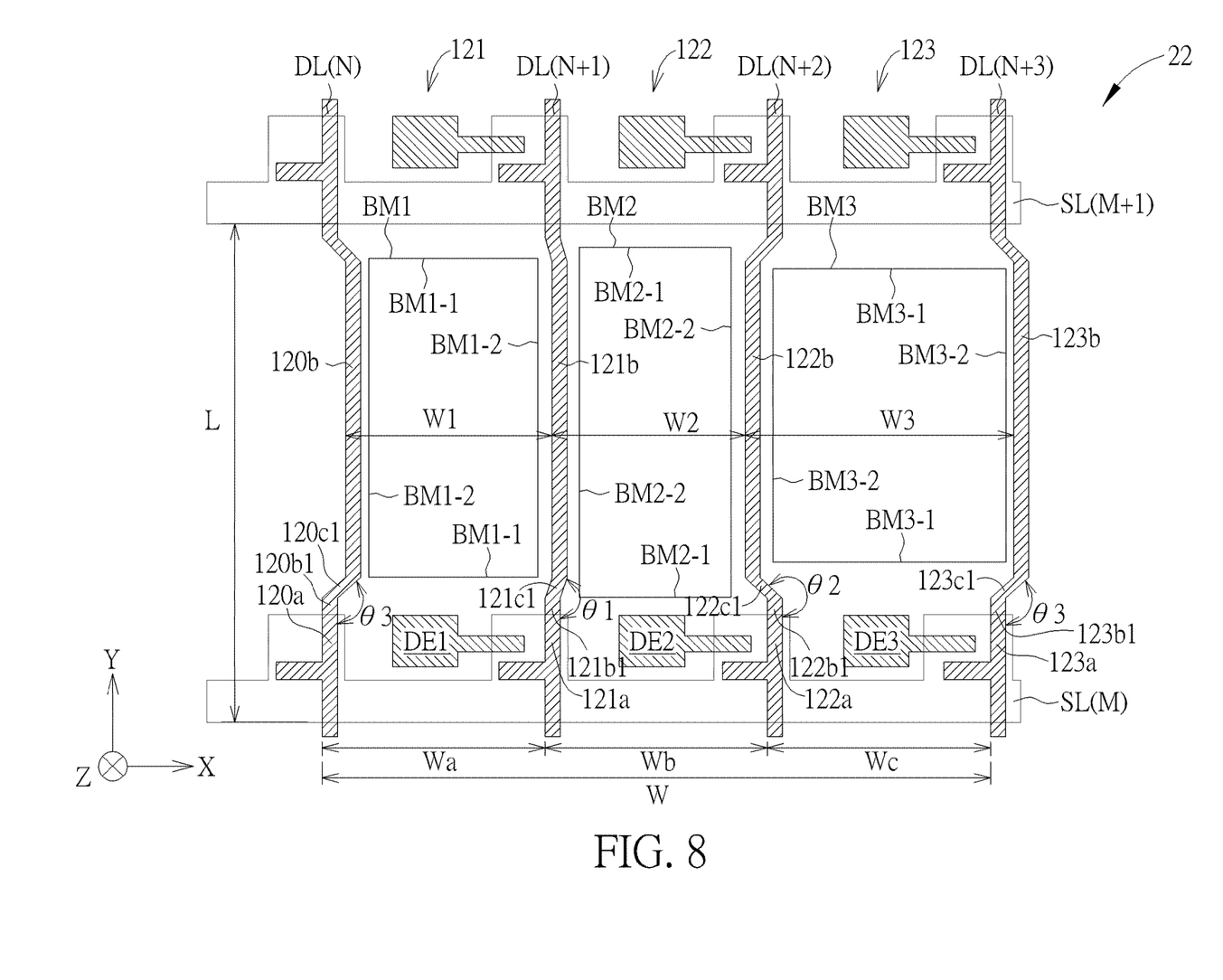
FIG. 8 is a schematic diagram illustrating an enlarged top view of a pixel unit of a display device according to another embodiment of the present disclosure.

Please refer to FIG. 8, which is a schematic diagram illustrating an enlarged top view a pixel unit 22 of a display device according to another embodiment of the present disclosure, wherein like reference numbers designate like or corresponding components as shown in FIG. 3 and FIG. 4. In accordance with the pixel unit 12 shown in FIG. 3 or FIG. 4, the pixel unit 22 shown in FIG. 8 is located between the adjacent first scan line SL(M) and the second scan line SL(M+1) and includes a first sub-pixel 121, a second sub-pixel 122 and a third sub-pixel 123 respectively located between the first data line DL(N) and the second data line DL(N+1), the second data line DL(N+1) and the third data line DL(N+2), the third data line DL(N+2) and the fourth data line DL(N+3). M and N are any positive integers, respectively. The first scan line SL(M) and the second scan line SL(M+1) respectively extend along the X direction and are arranged along the Y direction. The first data line DL(N), the second data line DL(N+1), the third data line DL(N+2), and the fourth data line DL(N+3) respectively extend along the Y direction and are arranged in sequence along the X direction. The pixel unit 22 has a length L and a width W. The length L of the pixel unit 22 is the minimum distance from an edge of the first scan line SL(M) to the corresponding edge of the second scan line SL(M+1). For example, as shown in FIG. 8, the length L of the pixel unit 22 is the distance from the lower edge of the first scan line SL(M) to the corresponding lower edge of the second scan line SL(M+1). The width W of the pixel unit 22 is the minimum distance from an edge of the first data line DL(N) to the corresponding edge of the fourth data line DL(N+3). For example, as shown in FIG. 8, the width W of the pixel unit 22 is the distance from the left edge of the first data line DL(N) to the left edge of the fourth data line DL(N+3). The first data line DL(N), the second data line DL(N+1), the third data line DL(N+2), and the fourth data line DL(N+3) respectively include the first segments 120a, 121a, 122a, 123a that overlap the first scan line SL(M) and the second segments 120b, 121b, 122b, 123b that are between the first scan line SL(M) and the second scan line SL(M+1). Furthermore, the second segment 120b of the first data line DL(N) may include a first portion 120b1 directly connecting the first segment 120a and a second portion 120c1 directly connecting the first portion 120b1. The second segment 121b of the second data line DL(N+1) may include a first portion 121b1 directly connecting the first segment 121a and a second portion 121c1 directly connecting the first portion 121b1. The second segment 122b of the third data line DL(N+2) may include a first portion 122b1 directly connecting the first segment 122a and a second portion 122c1 directly connecting the first portion 122b1. The second segment 123b of the fourth data line DL(N+3) may include a first portion 123b1 directly connecting the first segment 123a and a second portion 123c1 directly connecting the first portion 123b1. A difference between the pixel unit 22 in FIG. 8 and the pixel unit 12 in FIG. 3 or FIG. 4 is that, the first data line DL(N), the second data line DL(N+1), the third data line DL(N+2), and the fourth data line DL(N+3) do not have the middle bent portions.

As shown in FIG. 8, the pixel unit 22 further includes a first mask opening BM1 between the first data line DL(N) and the second data line DL(N+1), a second mask opening BM2 between the second data line DL(N+1) and the third data line DL(N+2), and a third mask opening BM3 between the third data line DL(N+2) and the fourth data line DL(N+3). The first mask opening BM1 has a pair of first edges BM1-1 and a pair of second edges BM1-2 between the first edges BM1-1. The second mask opening BM2 has a pair of first edges BM2-1 and a pair of second edges BM2-2 between the first edges BM2-1. The third mask opening BM3 has a pair of first edges BM3-1 and a pair of second edges BM3-2 between the first edges BM3-1. A difference between the pixel unit 22 in FIG. 8 and the pixel unit 12 in FIG. 4 is that, the second edges BM1-2, BM2-2 and BM3-2 extend along the Y direction and do not bend in the middle portions. In some embodiments, the angle Θ between the second edges BM1-2, BM2-2 and BM3-2, and the Y direction may be zero degree. The first data line DL(N), the second data line DL(N+1), the third data line DL(N+2), and the fourth data line DL(N+3) also extend along the Y direction and do not bend in the middle portions.

In accordance with the pixel unit 22 shown in FIG. 8, the angles between the first sections 120b1, 121b1, 122b1 and 123b1 and the corresponding second sections 120c1, 121c1, 122c1 and 123c1 are different to form smooth connections and also provide an uniform resistance of each of the data lines. The risk of broken data lines during manufacturing process may also be reduced. Furthermore, the distances Wa, Wb, We between the first segments 120a, 121a, 122a and 123a and the distances W1, W2, W3 between the second segments 120b, 121b, 122b and 123b of the data lines have at least one of the relationships as shown by equation 1 to equation 5. The angles Θ1, Θ2, Θ3 between the first portions 120b1, 121b1, 122b1 123b1 and the second portions 120c1, 121c1, 122c1 123c1 of the data lines have at least one of the relationships as shown by equation 6 to equation 9. At least two of the first masks opening BM1, the second mask opening BM2 and the third mask opening BM3 have different areas. The extending lines of at least two of the first edges BM1-1, the second edges BM2-1 and third edges BM3-1 do not overlap along the X direction in the pixel array region.

In conventional display devices, the adjustments for different application purposes are usually adjusting the gamma value of the sub-pixel units and/or adjusting the brightness of the R, G or B color dots. However, the brightness or the image quality of the display device may be significantly affected when large amount of adjustments are made. The display device provided by the disclosure may reduce the amount of the above adjustments by novel designs of the sub-pixel electrodes, adjusting the ratio of the widths of the sub-pixel electrodes, adjusting the capacitance, adjusting the bending angles of the data lines, and/or the adjusting areas of the openings in the black matrix layer of the display device. In this way, the display device provided by the disclosure may already be made to have R, G or B color dots or white dot closer to the targets of the application. Accordingly, problems of decreasing of overall display brightness and display quality of the display device caused by decreasing the brightness of any individual sub-pixel units may be reduced.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
   a substrate;
   a plurality of scan lines disposed on the substrate and extending along a first direction; and
   a plurality of data lines disposed on the substrate and extending along a second direction different from the first direction, wherein the plurality of data lines comprise a first data line, a second data line, a third data line and a fourth data line arranged in sequence and respectively comprising a first segment that overlaps one of the plurality of scan lines and a second segment that is located between adjacent two of the plurality of scan lines,
   wherein at least two of the second segment of the first data line, the second segment of the second data line, the second segment of the third data line and the second segment of the fourth data line have different lengths,
   wherein the second segment of the first data line, the second segment of the second data line, the second segment of the third data line and the second segment of the fourth data line respectively have a first portion connecting with the first segment and a second portion connecting with the first portion, wherein an angle between the first portion and the second portion of the first data line is different from an angle between the first portion and the second portion of the second data line, and the angle between the first portion and the second portion of the first data line and the angle between the first portion and the second portion of the second data line are not equal to 90 degree or 180 degree,
   wherein the first segment of the first data line and the first segment of the second data line are separated by a distance Wa, the first segment of the third data line and the first segment of the fourth data line are separated by a distance Wc, the second segment of the first data line and the second segment of the second data line are separated by a distance W1, and the second segment of the third data line and the second segment of the fourth data line are separated by a distance W3, and wherein the distances Wa, Wc, W1 and W3 have a relationship as defined below:

$$(W1/Wa) \neq (W3/Wc).$$

2. The display device according to claim 1, wherein the first segment of the second data line and the first segment of the third data line are separated by a distance Wb, and the second segment of the second data line and the second segment of the third data line are separated by a distance W2, wherein the distances W1, Wa, W2 and Wb have a relationship as defined below:

$$(W1/Wa) = (W2/Wb).$$

3. The display device according to claim 1, further comprising:
   a first thin-film transistor electrically connected to the second data line, wherein a first drain and a first gate of the first thin-film transistor have a first overlapping area;
   a second thin-film transistor electrically connected to the third data line, wherein a second drain and a second gate of the second thin-film transistor have a second overlapping area; and
   a third thin-film transistor electrically connected to the fourth data line, wherein a third drain and a third gate of the second thin-film transistor have a third overlapping area, wherein at least two of the first overlapping area, the second overlapping area and the third overlapping area are different.

4. The display device according to claim 3, wherein the first overlapping area is smaller than the third overlapping area.

5. The display device according to claim 4, wherein the distances W1, W3, Wa and We have a relationship as defined below:

$$(W1/Wa)<(W3/Wc).$$

6. The display device according to claim 1, further comprising:
a first sub-pixel electrode disposed between the first data line and the second data line;
a second sub-pixel electrode disposed between the second data line and the third data line; and
a third sub-pixel electrode disposed between the third data line and the fourth data line, wherein at least one of the first sub-pixel electrode, the second sub-pixel electrode and the third sub-pixel electrode partially overlapped with one of the plurality of data lines.

7. The display device according to claim 6, wherein at least two of the first sub-pixel electrode, the second sub-pixel electrode and the third sub-pixel electrode have different widths in the first direction.

8. The display device according to claim 7, wherein the width of the first sub-pixel electrode in the first direction is smaller than the width of the third sub-pixel electrode in the first direction.

9. The display device according to claim 6, wherein the first sub-pixel electrode, the second sub-pixel electrode and the third sub-pixel electrode respectively have a plurality of slits, and at least two of the plurality of slits of the first sub-pixel electrode, the plurality of slits of the second sub-pixel electrode and the plurality of slits of the third sub-pixel electrode have different lengths in the second direction.

10. The display device according to claim 9, wherein the slits of the first sub-pixel electrode, the second sub-pixel electrode and the third sub-pixel electrode have a same width in the first direction.

11. The display device according to claim 9, wherein at least two of the first sub-pixel electrode, the second sub-pixel electrode and the third sub-pixel electrode have different numbers of slits.

12. The display device according to claim 9, wherein the first sub-pixel electrode, the second sub-pixel electrode and the third sub-pixel electrode respectively have a plurality of branch electrodes between the slits thereof, and the branch electrodes of the first sub-pixel electrode, the second sub-pixel electrode and the third sub-pixel electrode have a same width in the first direction.

13. The display device according to claim 12, wherein the at least two of the first sub-pixel electrode, the second sub-pixel electrode and the third sub-pixel electrode have different numbers of branch electrodes.

14. The display device according to claim 1, further comprising:
a first mask opening disposed between the first data line and the second data line;
a second mask opening disposed between the second data line and the third data line; and
a third mask opening disposed between the third data line and the fourth data line, wherein at least two of the first mask opening, the second mask opening and the third mask opening have different areas.

15. The display device according to claim 14, wherein at least two of the first mask opening, second mask opening and third mask opening have different lengths in the second direction.

16. The display device according to claim 14, wherein at least two of the first mask opening, second mask opening and third mask opening have different widths in the first direction.

17. The display device according to claim 1, wherein the second segment of the first data line, the second segment of the second data line, the second segment of the third data line and the second segment of the fourth data line respectively have a bent portion and two extending portions disposed at two sides of the bent portion, and angles of the two extending portions of the second segment of the first data line, the second segment of the second data line, the second segment of the third data line and the second segment of the fourth data line, respectively, with respect to the second direction range from 5 to 15 degrees, wherein the angles of the two extending portions of the first data line, the second data line, the third data line and the fourth data line with respect to the second direction are the same.

* * * * *